United States Patent
Ikeda et al.

(10) Patent No.: US 11,170,487 B2
(45) Date of Patent: Nov. 9, 2021

(54) ADHERED SUBSTANCE DETECTION APPARATUS

(71) Applicant: DENSO TEN Limited, Kobe (JP)

(72) Inventors: Nobuhisa Ikeda, Kobe (JP); Nobunori Asayama, Kobe (JP); Takashi Kono, Kobe (JP); Yasushi Tani, Kobe (JP); Daisuke Yamamoto, Kobe (JP); Tomokazu Oki, Kobe (JP); Teruhiko Kamibayashi, Kobe (JP)

(73) Assignee: DENSO TEN Limited, Kobe (JP)

( * ) Notice: Subject to any disclaimer, the term of this patent is extended or adjusted under 35 U.S.C. 154(b) by 158 days.

(21) Appl. No.: 16/670,120

(22) Filed: Oct. 31, 2019

(65) Prior Publication Data
US 2020/0211171 A1  Jul. 2, 2020

(30) Foreign Application Priority Data
Dec. 28, 2018  (JP) .............................. JP2018-248533

(51) Int. Cl.
*G06K 9/00* (2006.01)
*G06T 7/00* (2017.01)
(Continued)

(52) U.S. Cl.
CPC .............. *G06T 7/0002* (2013.01); *G06T 7/13* (2017.01); *G06T 7/60* (2013.01); *H04N 17/002* (2013.01);
(Continued)

(58) Field of Classification Search
CPC .......... G06T 7/0002; G06T 7/13; G06T 7/60; G06T 2207/30168; G06T 2207/30252
See application file for complete search history.

(56) References Cited

U.S. PATENT DOCUMENTS

| | | | |
|---|---|---|---|
| 10,227,062 B2 * | 3/2019 | Kono | .................... B60S 1/0844 |
| 2014/0010408 A1 * | 1/2014 | Irie | ....................... G06T 7/0002 |
| | | | 382/103 |

(Continued)

FOREIGN PATENT DOCUMENTS

| | | | |
|---|---|---|---|
| DE | 102014219424 A1 * | 4/2015 | |
| DE | 102014219424 A1 * | 4/2015 | |

(Continued)

OTHER PUBLICATIONS

An Automatic Visibility Measurement System Based on Video Cameras, Taek Mu Kwon, University of Minnesota, Sep. 1998, pp. 1-62 (Year: 1998).*

*Primary Examiner* — Jayesh A Patel
(74) *Attorney, Agent, or Firm* — Oliff PLC

(57) ABSTRACT

An adhered substance detection apparatus includes a controller configured to function as a determination part, an extractor, and a detector. The determination part determines a representative edge direction using a predetermined angle range as a unit for each pixel area of a plurality of pixel areas of a photographic image photographed by a photographing device, the representative edge direction being determined for each of the pixel areas based on an edge angle of each pixel included in the pixel area. The extractor extracts an array pattern in which a plurality of the pixel areas having a same representative edge direction are continuously arranged along a predetermined scanning direction based on the representative edge directions of the pixel areas determined by the determination part. The detector detects whether an adhered substance area exists on a lens of the photographing device based on the array pattern extracted by the extractor.

8 Claims, 8 Drawing Sheets

(51) Int. Cl.
*G06T 7/13* (2017.01)
*H04N 17/00* (2006.01)
*G06T 7/60* (2017.01)

(52) U.S. Cl.
CPC .............. *G06T 2207/30168* (2013.01); *G06T 2207/30252* (2013.01)

(56) References Cited

U.S. PATENT DOCUMENTS

| | | | | |
|---|---|---|---|---|
| 2014/0029008 | A1* | 1/2014 | Hirai | G01N 21/552 356/445 |
| 2015/0172582 | A1* | 6/2015 | Kiyohara | H04N 5/2171 348/322 |
| 2015/0339535 | A1* | 11/2015 | Utagawa | G06T 7/246 348/118 |
| 2016/0364620 | A1* | 12/2016 | Akiyama | G06K 9/00791 |
| 2019/0041849 | A1* | 2/2019 | Kida | G06K 9/4604 |

FOREIGN PATENT DOCUMENTS

| | | | |
|---|---|---|---|
| JP | 2010014494 A | * | 1/2010 |
| JP | 2012-038048 A | | 2/2012 |
| JP | 201238048 A | * | 2/2012 |
| JP | 2018-072312 A | | 5/2018 |
| JP | 201872312 A | * | 5/2018 |

* cited by examiner

ADHERED SUBSTANCE DETECTION APPARATUS

BACKGROUND OF THE INVENTION

Field of the Invention

The invention relates to an adhered substance detection apparatus and an adhered substance detection method.

Description of the Background Art

Conventionally, there has been known an adhered substance detection apparatus that detects an adhered substance adhered to a lens of a camera based on a photographic image photographed by the camera mounted on a vehicle, or the like. The adhered substance detection apparatus detects an adhered substance, for example, based on a difference between time-series photographic images.

However, in a conventional technology, there has been room for improvement in terms of detecting an adhered substance early and with high accuracy.

SUMMARY OF THE INVENTION

According to one aspect of the invention, an adhered substance detection apparatus includes a controller configured to function as a determination part, an extractor, and a detector. The determination part determines a representative edge direction using a predetermined angle range as a unit for each pixel area of a plurality of pixel areas of a photographic image photographed by a photographing device, the representative edge direction being determined for each of the pixel areas based on an edge angle of each pixel included in the pixel area. The extractor extracts an array pattern in which a plurality of the pixel areas having a same representative edge direction are continuously arranged along a predetermined scanning direction based on the representative edge directions of the pixel areas determined by the determination part. The detector detects whether an adhered substance area exists on a lens of the photographing device based on the array pattern extracted by the extractor.

As a result, it is possible to detect the adhered substance early and with high accuracy.

Therefore, an object of the invention is to provide an adhered substance detection apparatus and an adhered substance detection method capable of detecting the adhered substance early and with high accuracy.

These and other objects, features, aspects and advantages of the invention will become more apparent from the following detailed description of the invention when taken in conjunction with the accompanying drawings.

DESCRIPTION OF THE EMBODIMENTS

Hereinafter, embodiments of an adhered substance detection apparatus and an adhered substance detection method disclosed in the present application will be described in detail with reference to accompanying drawings. The invention is not limited to the embodiments described below.

Figure 1:
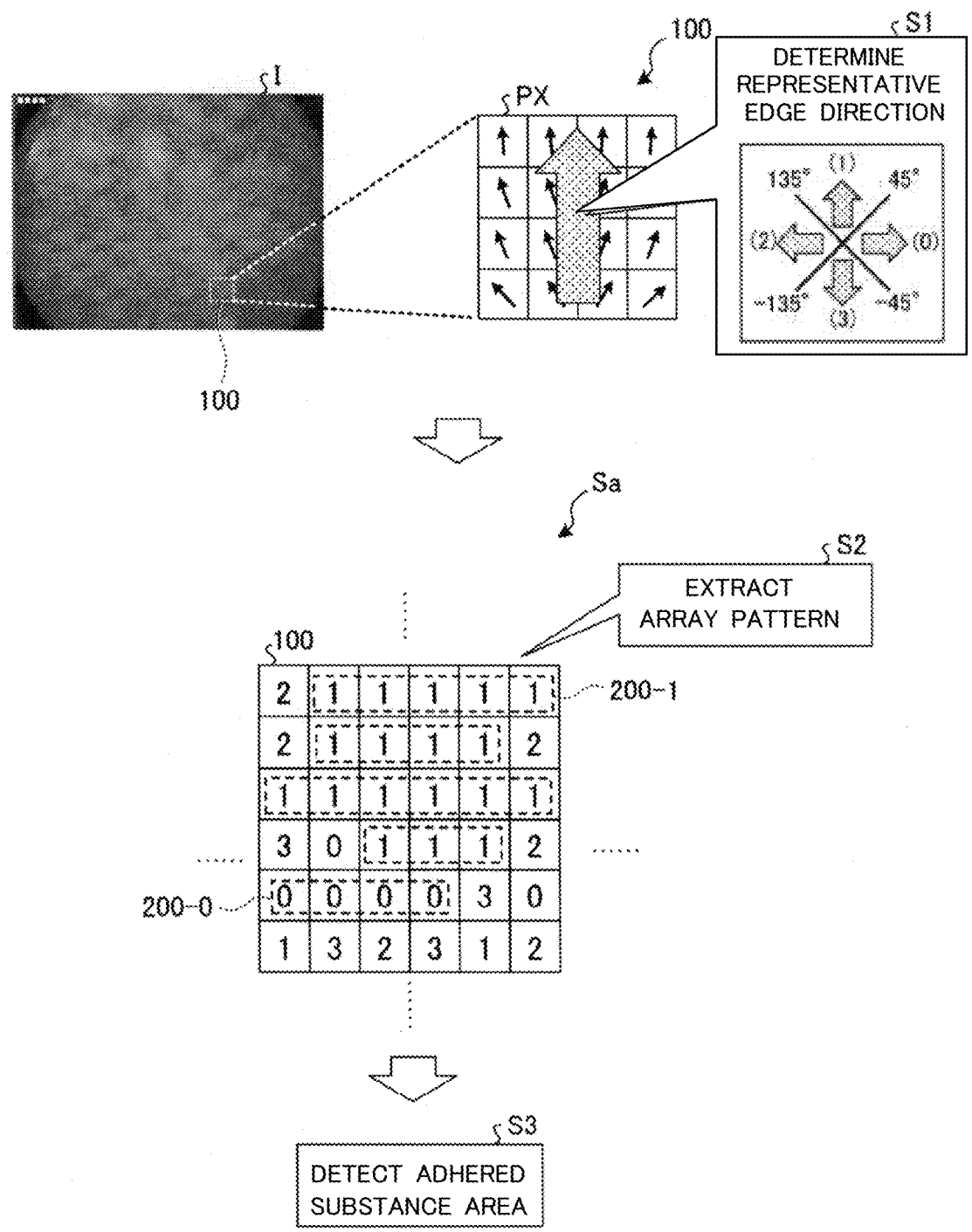
FIG. 1 illustrates an outline of an adhered substance detection method.

First, an outline of the adhered substance detection method according to the embodiment will be described with reference to FIG. 1. FIG. 1 illustrates the outline of the adhered substance detection method according to the embodiment. FIG. 1 shows a photographic image I photographed, for example, in a state in which snow adheres to a whole surface of a lens of an in-vehicle camera. The adhered substance detection method according to the embodiment is executed by an adhered substance detection apparatus 1 (see FIG. 2), and detects an adhered substance adhered to the lens of the in-vehicle camera based on the photographic image I photographed by the in-vehicle camera.

The adhered substance is not limited to snow, and may be, for example, light-colored dirt, or the like. In other words, although, in the photographic image I, the adhered substance prevents an object from being reflected, some light may transmit through the adhered substance and a small luminance change may be caused by a light transmission variation. FIG. 1 shows the photographic image I photographed in a state in which the whole surface of the lens of the camera is covered with snow.

Here, in a conventional adhered substance detection apparatus, there has been a technology that detects an adhered substance based on a difference between time-series photographic images. However, in the conventional technology, for example, when the whole surface of the lens is covered with snow, or the like, the difference between the images is hardly caused so that there is a possibility that the adhered substance cannot be detected. Furthermore, conventionally, since the time-series photographic images are required, it takes time to detect the adhered substance.

Therefore, in the adhered substance detection method according to the embodiment, an adhered substance is detected using an edge angle that is detected from one photographic image I. Specifically, as illustrated in FIG. 1, in the adhered substance detection method according to the embodiment, first, a representative edge direction using a predetermined angle range as a unit is determined for each pixel area 100 based on the edge angle (a vector direction within each pixel PX in FIG. 1) of each pixel PX included in the pixel area 100 of the photographic image I (a step 51).

For example, the pixel area 100 is an area in which the pixels PX are arranged in a 4×4 matrix (16 pixels PX in total). In an upper stage of FIG. 1, only one pixel area 100 is shown, but actually, in the entire photographic image I (or a part of the photographic image I for which the adhered substance is detected), a plurality of the pixel areas 100 is set in a two-dimensional array.

The representative edge direction is an edge direction representing the respective edge angles of 4×4 pixels PX. In FIG. 1, the representative edge direction is divided into four directions by each angle range of 90°, and one of the four representative edge directions is determined. A determination process of the representative edge direction will be described later with reference to FIG. 3 and FIG. 4. In FIG. 1, the representative edge directions are indicated by codes from "(0)" to "(3)", respectively, for convenience of explanation. That is, each of the pixel areas 100 is associated with each of the representative edge directions indicated by the codes from "(0)" to "(3)".

Subsequently, in the adhered substance detection method according to the embodiment, an array pattern in which the pixel areas 100 having the same representative edge direction are continuously arranged along a predetermined scanning direction is extracted (a step S2).

FIG. 1 shows an example in which the scanning direction is a horizontal direction. An array pattern 200-0 in which the code "0" continues in the horizontal direction and array patterns 200-1 in each of which the code "1" continues in the horizontal direction are shown.

When the array pattern 200-0 is not particularly distinguished from the array patterns 200-1, an array pattern 200 obtained by deleting a last digit in the numerical sequence is described. The scanning direction is not limited to the horizontal direction and may be a vertical direction. A horizontal direction array pattern 200 is combined with a vertical direction array pattern 200 to detect an adhered substance area. This point will be described in detail later with reference to FIG. 6 and subsequent drawings.

Subsequently, in the adhered substance detection method according to the embodiment, the adhered substance area on the lens of the camera, to which the adhered substance is adhered, is detected based on the array pattern 200 extracted in the step S2 (a step S3).

For example, in the adhered substance detection method according to the embodiment, the adhered substance area is detected for each division area Sa obtained by dividing the photographic image I into a plurality of areas. The division area Sa is, for example, an area including hundred (10×10) pixel areas 100. Since the pixel area 100 consists of 16 (4×4) pixels PX, the division area Sa consists of 1600 (16×100) pixels PX.

For example, when snow is detected as the adhered substance, in an area (hereinafter, referred to as a "snow-covered area") in which the lens is covered with snow, an edge gently changes so that the edge angle gently changes. That is, the snow-covered area has a feature that the pixel areas 100 having the same representative edge direction are likely to be continuously arranged.

In the snow-covered area, since snow accumulating on the lens has a concave and convex shape, the array patterns 200 based on plural types of the representative edge directions tend to appear in one division area Sa. Furthermore, since a size of snow (a size of the concave and convex shape) is limited to a predetermined size, the snow-covered area has a feature that a length of each of the array patterns 200 falls within a predetermined range.

In other words, in the snow-covered area, the array patterns 200 based on the plural types of the representative edge directions are included in one division area Sa. On the other hand, in an area other than the snow-covered area (hereinafter, referred to as a "background area"), since the edge of each pixel PX changes due to a background image, it is difficult to acquire the feature of the snow-covered area described above.

Therefore, in the adhered substance detection method according to the embodiment, as one example of detection conditions, the adhered substance area is detected for the division area Sa that includes plural types of the array patterns 200, each of which satisfies a predetermined length condition. As a result, in the adhered substance detection method according to the embodiment, the snow-covered area can be detected as the adhered substance area.

As described above, in the adhered substance detection method according to the embodiment, by detecting the adhered substance based on the array pattern 200 in which the pixel areas 100 having the same representative edge direction are continuously arranged, even when the difference between the images is not caused, it is possible to detect the adhered substance with high accuracy.

In the adhered substance detection method according to the embodiment, it is possible to detect the adhered substance using one photographic image I. Therefore, in the adhered substance detection method according to the embodiment, it is possible to detect the adhered substance early and with high accuracy.

Figure 2:
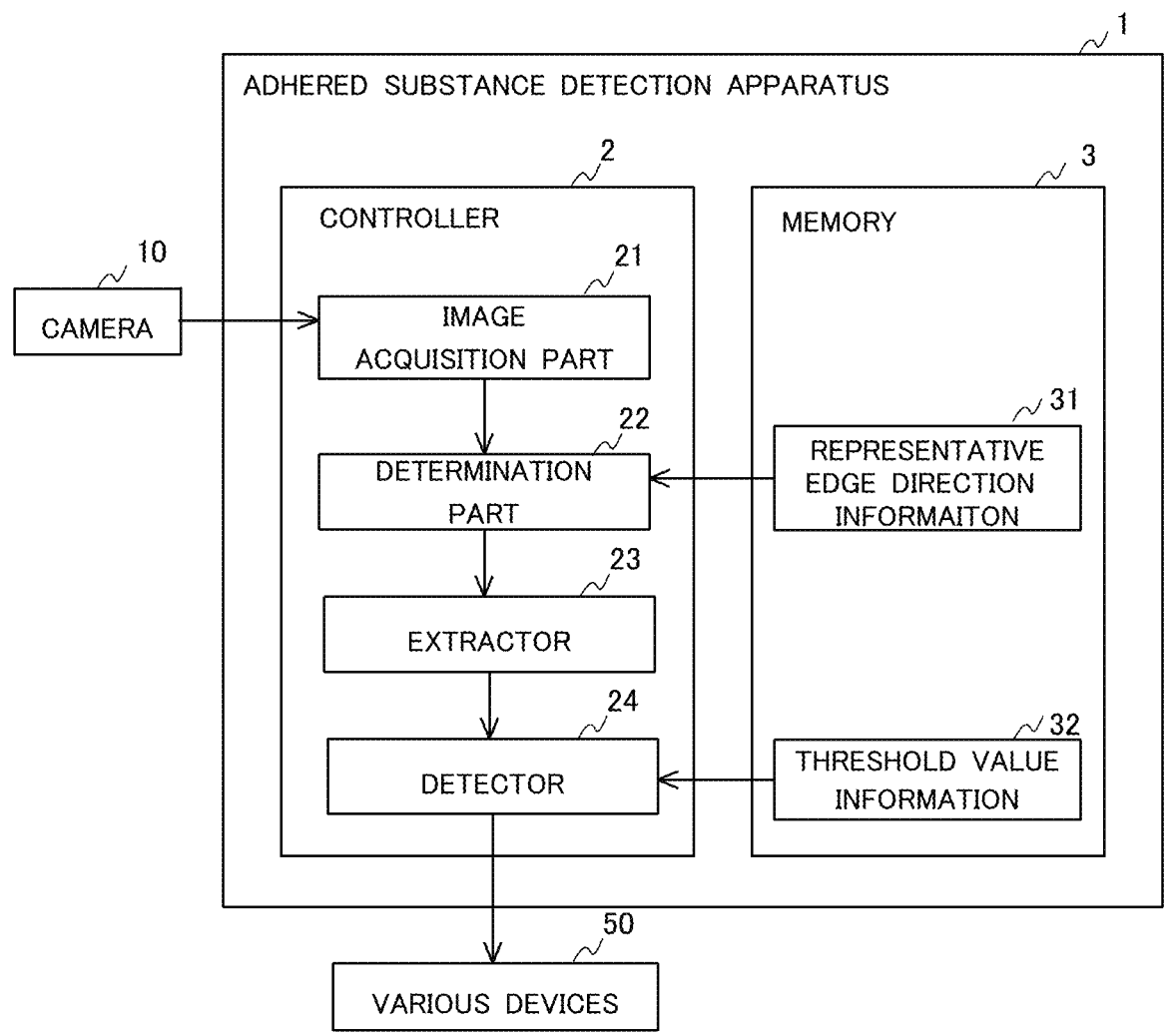
FIG. 2 is a block diagram illustrating a configuration of an adhered substance detection apparatus.

Next, a configuration of the adhered substance detection apparatus 1 according to the embodiment will be described with reference to FIG. 2. FIG. 2 is a block diagram illustrating the configuration of the adhered substance detection apparatus 1 according to the embodiment. As illustrated in FIG. 2, the adhered substance detection apparatus 1 according to the embodiment is connected to a camera 10 and various devices 50. In FIG. 2, the adhered substance detection apparatus 1 is configured separately from the camera 10 and the various devices 50, but is not limited to thereto. The adhered substance detection apparatus 1 may be configured integrally with at least one of the camera 10 and the various devices 50.

The camera 10 is, for example, an in-vehicle camera including a lens, such as a fish-eye lens, and an imaging element, such as a CCD (Charge Coupled Device) or a CMOS (Complementary Metal Oxide Semiconductor). The camera 10 is, for example, provided at each position capable of photographing front, rear and side images of a vehicle, and outputs the photographed photographic image I to the adhered substance detection apparatus 1.

The various devices 50 acquire a detection result of the adhered substance detection apparatus 1 to perform various control of the vehicle. The various devices 50 include, for example, a display device that informs a user that an adhered substance is adhered to the lens of the camera 10 and instructs the user to remove the adhered substance from the lens, a removing device that removes the adhered substance from the lens by spraying a fluid, air, etc. onto the lens, and a vehicle control device that controls autonomous driving, or the like.

As illustrated in FIG. 2, the adhered substance detection apparatus 1 according to the embodiment includes a controller 2 and a memory 3. The controller 2 includes an image acquisition part 21, a determination part 22, an extractor 23 and a detector 24. The memory 3 stores representative edge direction information 31 and threshold value information 32.

Here, the adhered substance detection apparatus 1 includes a computer having, for example, a CPU (Central Processing Unit), a ROM (Read Only Memory), a RAM (Random Access Memory), a data flash, an input/output port, and the like, and various circuits.

The CPU of the computer, for example, reads out and executes a program stored in the ROM so as to function as the image acquisition part 21, the determination part 22, the extractor 23 and the detector 24 of the controller 2.

At least one or all of the image acquisition part 21, the determination part 22, the extractor 23 and the detector 24 of the controller 2 may be constituted of hardware such as an ASIC (Application Specific Integrated Circuit) and a FPGA (Field Programmable Gate Array).

The memory 3 corresponds to the RAM or data flash, for example. The RAM and data flash may store the representative edge direction information 31, the threshold value information 32, or information on various programs. The adhered substance detection apparatus 1 may acquire the programs or information described above via computers connected via a wired or wireless network or a portable recording medium.

The representative edge direction information 31 is information related to the representative edge direction using the predetermined angle range as a unit. Specific examples of the representative edge direction information 31 will be described later with reference to FIG. 4. The threshold value information 32 is information related to a threshold value used when detecting the adhered substance area. As described later, the threshold value information 32 is information related to a threshold value for each of a total value of products in a first angle range and a total value of products in a second angle range.

The controller 2 determines the representative edge direction for each of the pixel areas 100 of the photographic image I, extracts the array pattern 200 in which the pixel areas 100 having the same representative edge direction are continuously arranged, and detects the adhered substance area based on the extracted array pattern 200.

The image acquisition part 21 acquires the photographic image I photographed by the camera 10. The image acquisition part 21 performs a grayscale conversion of expressing each pixel of the acquired photographic image I in gray scales from white to black depending on the luminance, performs a smoothing process on each pixel, and outputs the processed pixel to the determination part 22. For example, an averaging filter or an arbitrary smoothing filter, such as a Gaussian filter, may be used for the smoothing process. The gray scale conversion and the smoothing process may be omitted.

The determination part 22 determines the representative edge direction for each of the pixel areas 100 of the photographic image I acquired from the image acquisition part 21. Here, the determination process of the representative edge direction by the determination part 22 will be specifically described with reference to FIG. 3 and FIG. 4.

Figure 3:
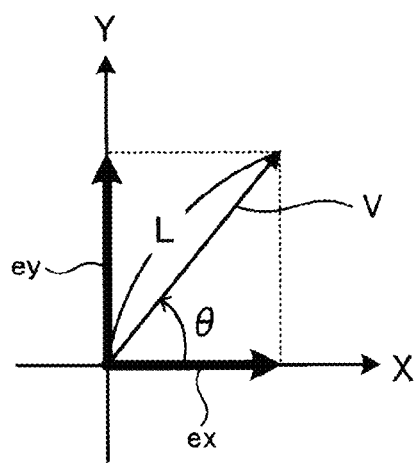
FIG. 3 illustrates a process of a determination part.
Figure 4:
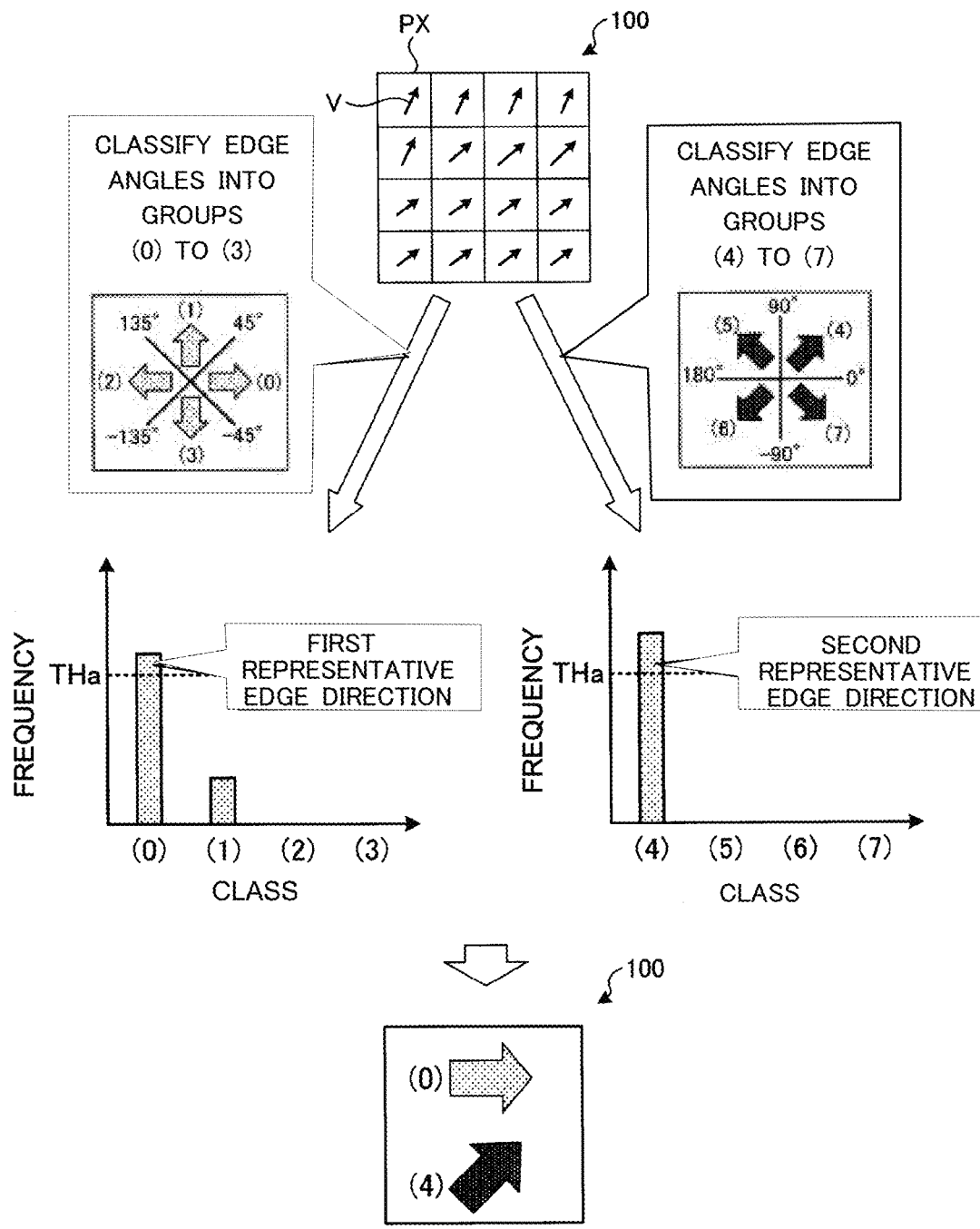
FIG. 4 illustrates a process of the determination part.

Each of FIG. 3 and FIG. 4 shows a process of the determination part 22. As shown in FIG. 3, the determination part 22 first performs an edge detection process to detect a strength of an edge ex in an X-axis direction (horizontal direction of the photographic image I) and a strength of an edge ey in a Y-axis direction (vertical direction of the photographic image I). For example, a Sobel filter or an arbitrary edge detection filter, such as a Prewitt filter, may be used for the edge detection process.

Subsequently, the determination part 22 calculates a vector V including information of the edge angle and edge strength of the pixel PX using a trigonometric function based on the detected strength of the edge ex in the X-axis direction and the detected strength of the edge ey in the Y-axis direction. Specifically, an angle θ between the vector V and the X-axis on the positive direction side will be referred to as an edge angle, and the length L of the vector V will be referred to as an edge strength of each pixel.

Subsequently, the determination part 22 determines the representative edge direction in the pixel area 100 based on the calculated vector V of each pixel PX. Specifically, as illustrated in FIG. 4, each pixel PX (having an angle range of −180° to 180°) is divided into four parts (each having an angle range of 90°, and the four parts (groups) are indicated by codes "(0)" to "(3)", respectively. The determination part 22 classifies each edge angle into each of the groups "(0)" to "(3)" based on the vector V of each pixel PX in the pixel area 100.

Specifically, when the edge angle in the vector V is within an angle range of −45° or more and less than 45°, the determination part 22 classifies the edge angle into the group "(0)". When the edge angle in the vector V is within an angle range of 45° or more and less than 135°, the determination part 22 classifies the edge angle into the group "(1)". When the edge angle in the vector V is within an angle range of 135° or more and less than 180° or within an angle range of −180° or more and less than −135°, the determination part 22 classifies the edge angle into the group "(2)". When the edge angle in the vector V is within an angle range of −135° or more and less than −45°, the determination part 22 classifies the edge angle into the group "(3)".

As shown in a lower stage of FIG. 4, for each of the pixel areas 100, the determination part 22 creates a histogram using each of the groups "(0)" to "(3)" as each of classes. When a frequency of a class whose frequency is the highest in the created histogram is a predetermined threshold value THa or more, the determination part 22 determines the group corresponding to the class (group "(1)" in FIG. 4) as the representative edge direction in the pixel area 100. That is, the determination process of the representative edge direction by the determination part 22 can be regarded as a process of encoding each of the pixel areas 100.

The frequency of the histogram is calculated by summing up the edge strengths of the pixels PX which are classified into a same angle range among the pixels PX within the pixel area 100. Specifically, the frequency of the histogram that belongs to the group (class) "(0)" will be considered. For example, there are three pixels PX which are classified into the group (class) "(0)", and the edge strengths of the three pixels PX are 10, 20, and 30, respectively. In this case, the frequency of the histogram that belongs to the group (class) "0" is calculated by the following equation: 10+20+30=60. The frequency of the histogram that belongs to the group (class) "(1)", "(2)", or "(3)" is calculated in a similar manner.

Based on the calculated histogram, the determination part 22 determines the edge strength. Specifically, when the frequency of the class whose frequency is the highest in the histogram is the predetermined threshold value THa or more, the frequency corresponding to the class is regarded as the edge strength. That is, a determination process of a representative edge strength by the determination part 22 can be regarded as a process of extracting a feature related to the edge strength within the pixel area 100 corresponding to the representative edge direction.

On the other hand, when the frequency of the class whose frequency is the highest is less than the predetermined threshold value THa, the determination part 22 regards the representative direction in the pixel area 100 as "invalid", in other words, "no representative direction". As a result, when there is a large variation in the edge angles of each pixel PX, it is possible to prevent an erroneous determination of a specific representative edge direction.

As described above, the determination part 22 associates each of the representative edge directions respectively different in the first angle range and the second angle range with each of the pixel areas 100. As a result, since a data amount used for detection of the adhered substance area can be increased, it is possible to improve detection accuracy of the adhered substance area.

The determination process of the determination part 22 shown in FIG. 3 and FIG. 4 is merely one example, and the process may be arbitrary as long as the process is capable of determining the representative edge direction. For example, a mean value of the edge angles of the pixels PX in the pixel area 100 is calculated so as to determine the representative edge direction in the angle range corresponding to the mean value.

FIG. 4 shows an example in which one pixel area 100 consists of 16 (4×4) pixels PX, but a number of the pixels PX in the pixel area 100 may be arbitrarily set and may be different in vertical and horizontal directions, such as 3×5 pixels.

Referring back to FIG. 2, the extractor 23 will be described. The extractor 23 extracts the array pattern 200 in which the pixel areas 100 having the same representative edge direction are continuously arranged along the predetermined scanning direction based on the representative edge direction determined by the determination part 22.

Specifically, the extractor 23 scans a plurality of the pixel areas 100 of the photographic image I that are arranged in a two-dimensional (horizontal and vertical) array in horizontal and vertical directions, and extracts the array pattern 200. The horizontal and vertical directions are one example of first and second scanning directions. The scanning direction is not limited to the horizontal and vertical directions, but may be an oblique direction.

Figure 5:
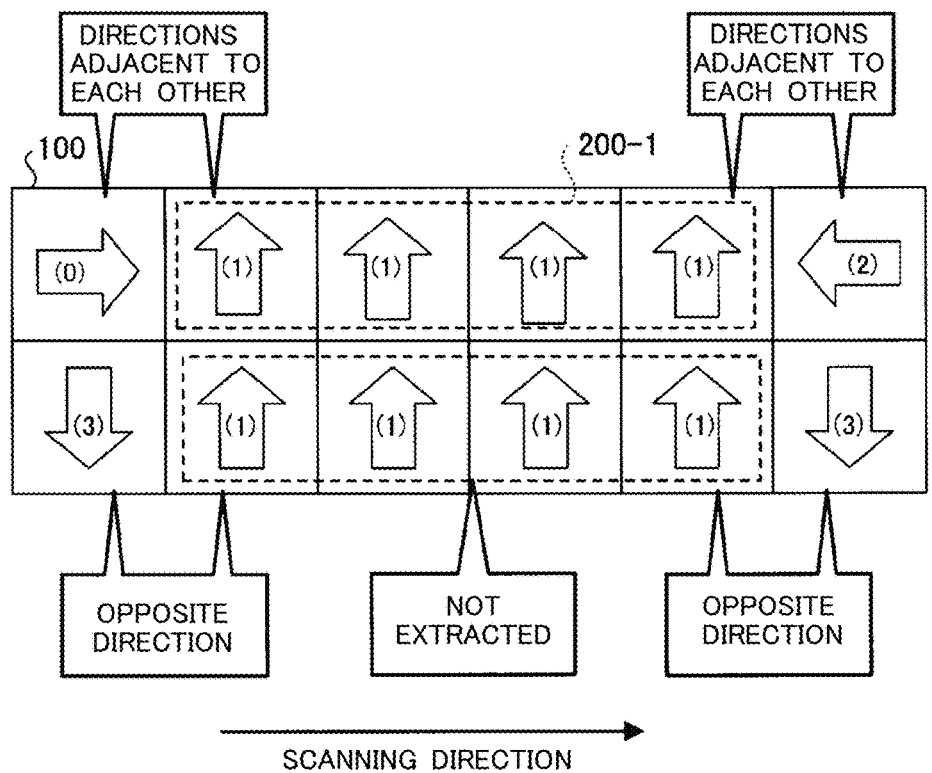
FIG. 5 illustrates a specific example of an array pattern.

Here, when two pixel areas 100 positioned on opposite sides of an array composed of the plurality of the pixel areas 100 along the scanning direction have the representative edge directions (group "(0)" and group "(2)") adjacent to the representative edge direction (group "(1)") of the array pattern 200, the extractor 23 extracts the array as the array pattern 200. FIG. 5 shows a specific example of the array pattern 200.

FIG. 5 shows an example of a process of extracting an array pattern 200-1 corresponding to the first angle range by scanning in the horizontal direction. However, the same applies to the process of extracting the array pattern 200 having the representative edge directions corresponding to the second angle range by scanning in the vertical direction. In FIG. 5, in order to facilitate visual recognition, the representative edge directions are indicated by arrows and the above-mentioned codes "(0)" to "(3)".

As shown in FIG. 5, when four pixel areas 100 whose representative edge directions belong to "(1)" are continuously arranged, the extractor 23 refers to the representative edge directions of two pixel areas 100 positioned on opposite sides of an array of the four pixel areas 100, and extracts the array pattern 200-1.

Specifically, as shown in an upper stage of FIG. 5, when two pixel areas 100 positioned on opposite sides of an array pattern composed of four pixel areas 100 have the representative edge directions "(0)" and "(2)" adjacent to the representative edge direction "(1)" of the array pattern, the extractor 23 extracts the array pattern as the array pattern 200-1.

On the other hand, as shown in a lower stage of FIG. 5, when two pixel areas 100 positioned on opposite sides of an array pattern composed of four pixel areas 100 have the representative edge direction "(3)" opposite to the representative edge direction "(1)" of the array pattern, the extractor 23 does not extract the array pattern as the array pattern 200-1.

As described above, since, in the snow-covered area, the edge angle gently changes so that the edge angle continuously changes, the adjacent pixel areas 100 hardly have the representative edge directions opposite to each other.

When at least one of the two pixel areas 100 positioned on opposite sides of the array pattern has the representative edge direction opposite to that of the array pattern, the array pattern needs not be extracted.

That is, the extractor 23 extracts only the array pattern 200 having the representative edge direction that continuously changes along the scanning direction, and excludes the array pattern having the representative edge direction that irregularly changes along the scanning direction from extracted targets. As a result, it becomes possible to improve extraction accuracy of the array pattern 200 corresponding to the snow-covered area.

As described above, since, in the snow-covered area, the representative edge direction continuously changes, the snow-covered area has the feature that the length of one array pattern falls within the predetermined range. As a result, the extractor 23 can extract only the array pattern 200 whose length falls within the predetermined range.

Here, the predetermined range is, for example, a range from 24 pixels PX (three pixel areas 100) to 100 pixels PX (twenty-five pixel areas 100), but is not limited thereto and may be changed arbitrarily.

As a result, it is possible to extract only the array pattern 200 corresponding to the snow-covered area. In other words, since the array pattern that is inconsistent with the feature of the snow-covered area is not extracted, it is possible to improve detection accuracy of the snow-covered area as the adhered substance area.

Referring back to FIG. 2, the detector 24 will be described. The detector 24 detects the adhered substance area based on the array pattern 200 extracted by the extractor 23. The detector 24 detects the adhered substance area based on an intersection between the array pattern 200 scanned along the vertical direction and the array pattern 200 scanned along the horizontal direction.

Figure 6:
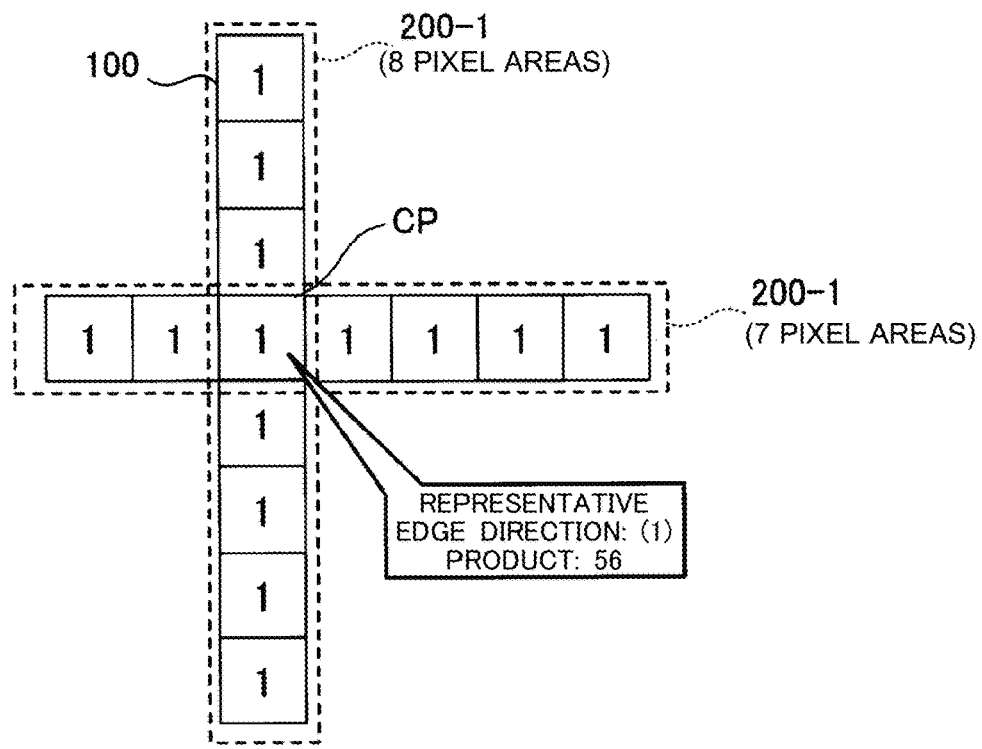
FIG. 6 illustrates a process of a detector.
Figure 7:
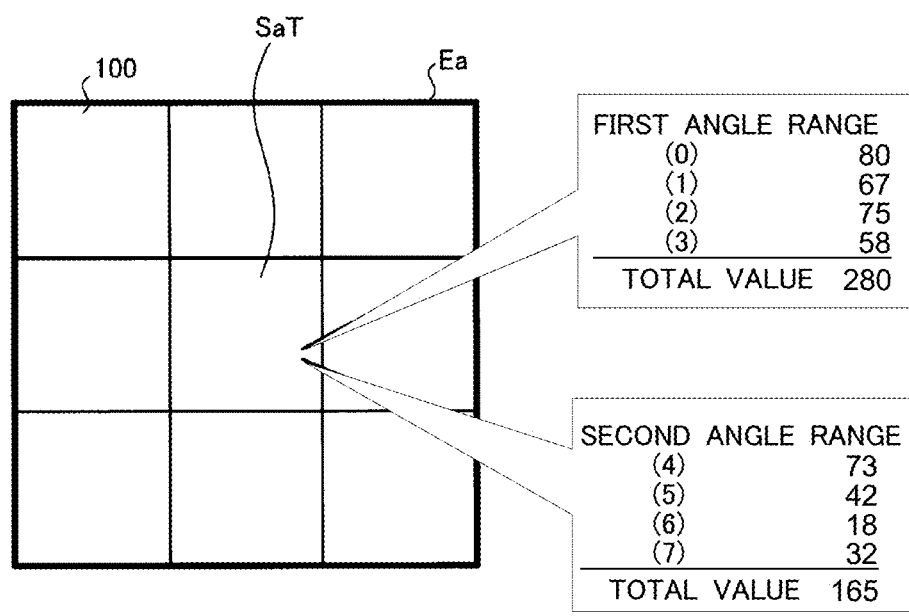
FIG. 7 illustrates a process of the detector.

Each of FIG. 6 and FIG. 7 shows a process by the detector 24. In FIG. 6, the process for an array pattern 200-1 having the representative edge direction "(1)" by the detector 24 will be described, but the same applies to array patterns having other representative edge directions "(0)" and "(2)" to "(7)".

As shown in FIG. 6, the detector 24 calculates an intersection CP between the array pattern 200-1 in which eight pixel areas 100 having the representative edge direction "(1)" are continuously arranged along the vertical direction and the array pattern 200-1 in which 7 pixel areas 100 having the representative edge direction "(1)" are continuously arranged along the horizontal direction.

Subsequently, the detector 24 calculates a product of a number of the pixel areas of both array patterns 200-1 that form the intersection CP. FIG. 6 shows an example in which the product is represented by "8×7=56". That is, in this embodiment, by calculating the product of each intersection CP, it becomes possible to estimate an aggregate size of the pixel areas 100 having the same representative edge direction corresponding to each intersection CP.

This means, as the product of each intersection CP increases, the pixel areas 100 having the same representative edge direction are continuously distributed in a wider range. That is, by calculating the product of each intersection CP, it is possible to easily calculate the aggregate (chunk) size of the pixel areas 100 having the same representative edge direction.

The detector 24 may exclude the array pattern 200 that extends either in the vertical direction or in the horizontal direction on a basis of each of the pixel areas 100 by detecting the adhered substance area based on the intersection CP of the array pattern 200. That is, the detector 24 uses only the array pattern 200 extending radially for the detection of the adhered substance area on the basis of each of the pixel areas 100. The detector 24 associates the intersection CP with the representative edge direction and intersection information indicating the above-mentioned product.

The detector 24 may count the number of the pixel areas 100 forming one chunk of the same representative edge direction instead of the product of the intersection CP. In this case, for example, a sum of the number of the pixel areas 100 included in the array pattern 200-1 extracted along the horizontal direction and the number of the pixel areas 100 included in the array pattern 200-1 perpendicular to the above-mentioned array pattern 200-1 may be calculated as a size of one chunk of the same representative edge direction.

Subsequently, as shown in FIG. 7, the detector 24 sets an attention area SaT and determines whether or not the attention area SaT is the adhered substance area based on the intersection CP in an extension area Ea obtained by extending the attention area SaT.

Here, the attention area SaT is one division area Sa, and the extension area Ea is 3×3 division areas Sa centered on the attention area Sat. The extension area Ea is centered on the attention area SaT, and may be another area that is wider than the attention area SaT.

The detector 24 determines whether or not the attention area SaT is the adhered substance area based on the intersection information included in the extension area Ea. Specifically, as shown in FIG. 7, the sum of the products based on each of the first angle range and the second angle range is calculated for each of the representative edge directions.

FIG. 7 shows an example in which sums of products of representative edge directions "(0)" to "(3)" based on the first angle range are "80", "67", "75", and "58", respectively, and a total value obtained by summing up the sums is "280".

FIG. 7 shows an example in which sums of products of representative edge directions "(4)" to "(7)" based on the second angle range are "73", "42", "18", and "32", respectively, and a total value obtained by summing up the sums is "165".

When there are the intersections CP associated with all types of the representative edge directions in the extension area Ea, and both the total value of the products in the first angle range and the total value of the products in the second angle range exceed a predetermined total threshold value, the detector 24 detects the attention area SaT as the adhered substance area.

As described above, by including the types of the representative edge directions associated with the intersections CP in the detection condition, it is possible to easily determine the feature of the snow-covered area in which a wide variety of the representative edge directions are included.

When the products of the respective representative edge directions in the first angle range and the second angle range are equal to "1" or more, and the respective total values of the products in the first angle range and the second angle range exceed the predetermined total threshold value, the detector 24 detects the attention area SaT as the adhered substance area.

That is, when the extension area Ea includes the intersections CP based on all types of the representative edge directions, and is an aggregate of the division areas Sa in which chunks of the respective representative edge directions have a certain size, the detector 24 detects the attention area SaT as the adhered substance area.

As described above, by deriving the sum of the products in the respective representative edge directions, it is possible to easily understand percentages of the pixel areas 100 having each of the representative edge directions in the attention area SaT.

When the detection condition is satisfied in both the first angle range and the second angle range, the attention area SaT is detected as the adhered substance area. As a result, it is possible to reduce erroneous detection of the adhered substance area as compared to when the detection condition is satisfied either in the first angle range or in the second angle range, the attention area SaT is detected as the adhered substance area.

The detector 24 determines whether or not the attention area SaT is the adhered substance area based on the intersections CP included in the extension area Ea obtained by extending the attention area SaT. This is because if the attention area SaT is the snow-covered area, there is a high possibility that an area around the attention area SaT is also the snow-covered area.

In other words, there is a low possibility that only one attention area SaT becomes the snow-covered area. That is, by determining whether or not the attention area SaT is the adhered substance area based on the extension area Ea obtained by extending the attention area SaT, it is possible to improve the detection accuracy of the snow-covered area.

Figure 8:
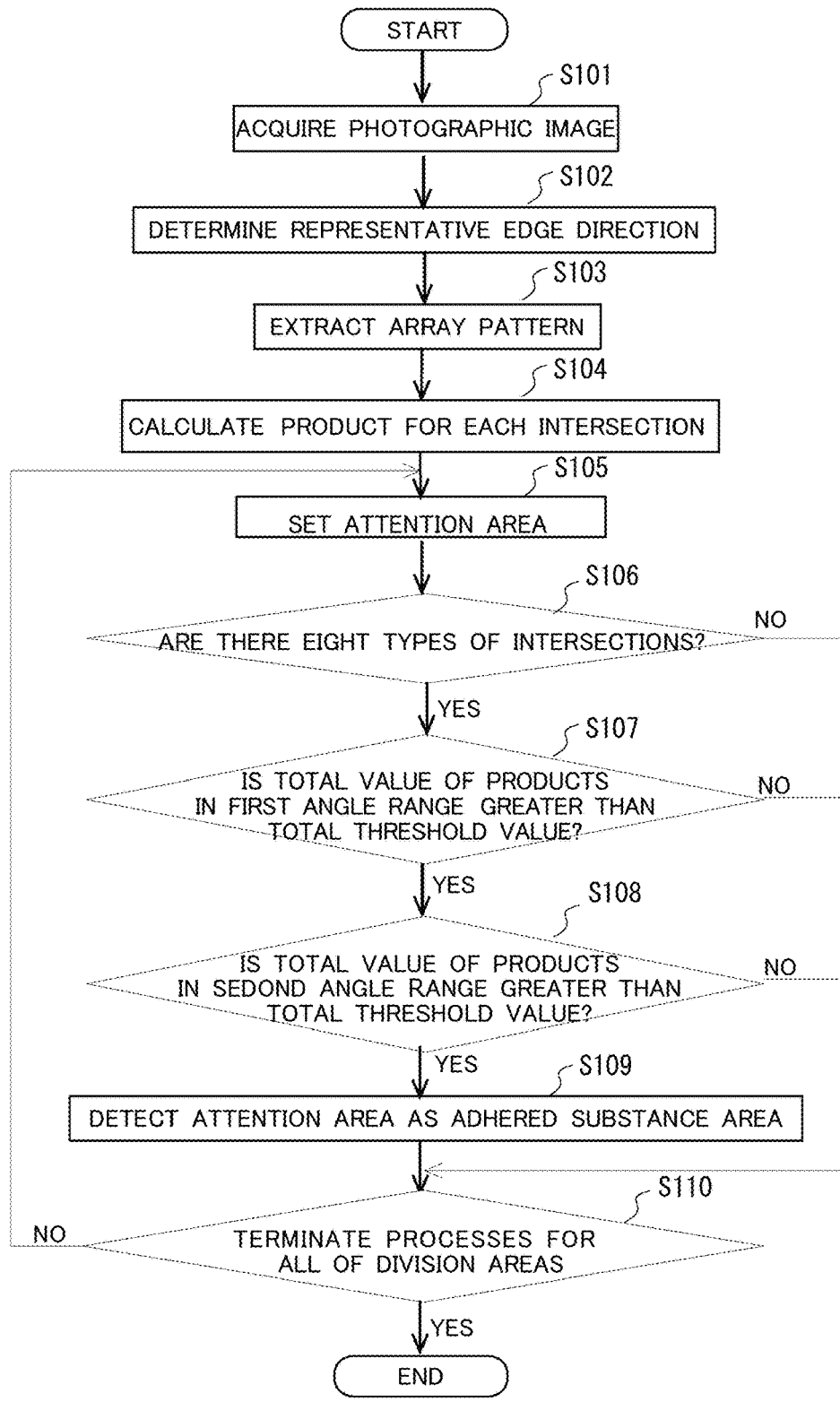
FIG. 8 is a flowchart illustrating a processing procedure of a detection process of an adhered substance executed by the adhered substance detection apparatus.

Next, a processing procedure executed by the adhered substance detection apparatus 1 according to the embodiment will be described with reference to FIG. 8. FIG. 8 is a flowchart illustrating the processing procedure executed by the adhered substance detection apparatus 1. The processing procedure shown below is executed repeatedly by the controller 2 for each acquisition of the photographic image I.

As shown in FIG. 8, first, when the adhered substance detection apparatus 1 has acquired the photographic image I (a step S101), the adhered substance detection apparatus 1 determines the representative edge direction for each of the pixel areas 100 (a step S102). Subsequently, the adhered substance detection apparatus 1 extracts the array pattern 200 in which the representative edge direction satisfies an extraction condition (a step S103), and calculates the product for each intersection CP (a step S104).

Subsequently, the adhered substance detection apparatus 1 sets the attention area SaT (a step S105), and determines whether or not there are eight types of the intersections CP associated with different representative edge directions in the extension area Ea including the attention area SaT (a step S106).

In the determination process of the step S106, when there are eight types of the intersections CP (Yes in the step S106), the adhered substance detection apparatus 1 determines whether or not the total value of the products in the first angle range is greater than the total threshold value (a step S107).

In the determination process of the step S107, when the total value of the products exceeds the total threshold value (Yes in the step S107), the adhered substance detection apparatus 1 then determines whether or not the total value of the products in the second angle range is greater than the total threshold value (a step S108).

In the determination process of the step S108, when the total value of the products exceeds the total threshold value (Yes in the step S108), the adhered substance detection apparatus 1 detects the attention area SaT as the adhered substance area (a step S109).

The adhered substance detection apparatus 1 determines whether or not each process of the step S105 to the step S109 has been terminated for all of the division areas Sa (a step S110), and when each process has been terminated for all of the division areas Sa (Yes in the step S110), the adhered substance detection apparatus 1 ends the process.

On the other hand, in the determination process of the step S110, when each process has not been terminated for all of the pixel areas 100 (No in the step S110), the adhered substance detection apparatus 1 moves to the step S105.

In the determination process of the step S106, when there are seven or less types of the intersections (No in the step S106), and when the total value of the products is equal to or less than the total threshold value in each determination process of the step S107 and the step S108 (No in the step S107 and the step S108), the adhered substance detection apparatus 1 moves to the step S110.

As described above, the adhered substance detection apparatus 1 according to the embodiment includes the determination part 22, the extractor 23, and the detector 24. The determination part 22 determines the representative edge direction using the predetermined angle range as a unit for each of the pixel areas 100 based on the edge angle of each pixel PX included in the pixel area 100 of the photographic image I photographed by the photographing device.

The extractor 23 extracts the array pattern 200 in which the pixel areas 100 having the same representative edge direction are continuously arranged along the predetermined scanning direction based on the representative edge direction determined by the determination part 22. The detector 24 detects the adhered substance area on the lens of the photographing device, to which an adhered substance is adhered, based on the array pattern 200 extracted by the extractor 23. Therefore, the adhered substance detection apparatus 1 according to the embodiment can detect the adhered substance early and with high accuracy.

In the embodiment described above, a case in which the respective representative edge directions are determined in both the first angle range and the second angle range has been described. However, the representative edge directions may be determined either in the first angle range or in the second angle range.

Figure 9:
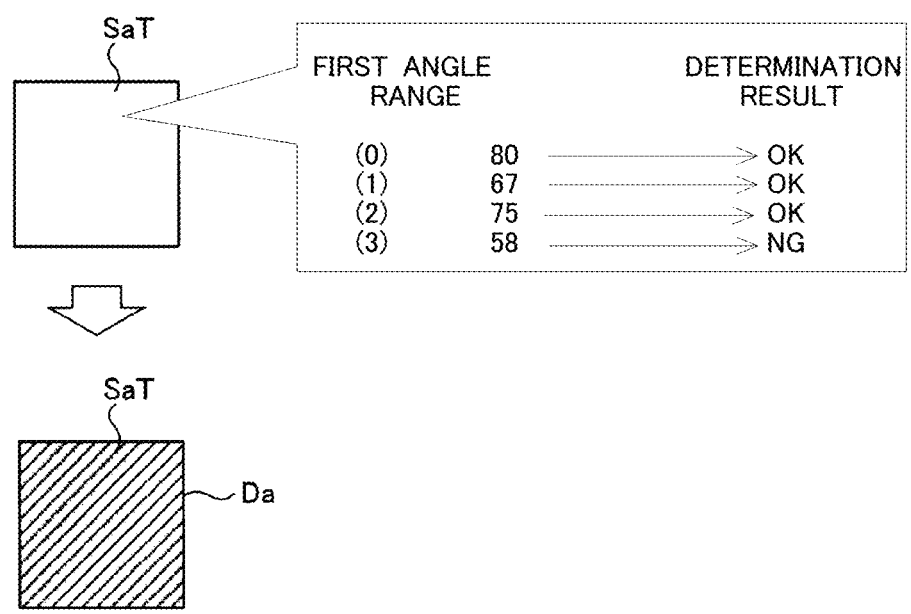
FIG. 9 illustrates a process of a detector according to a modification.

FIG. 9 illustrates a process of a detector 24 according to a modification. Here, a case in which an adhered substance area is detected based on representative edge directions in a first angle range will be described. However, the same applies to a case in which the adhered substance area is detected based on the representative edge directions in a second angle range.

As shown in FIG. 9, the detector 24 calculates a sum of the respective products of the representative edge directions "(0)" to "(3)" based on intersections CP included in an attention area SaT. The detector 24 determines whether or not the sum of the products satisfies a detection condition for each of the representative edge directions "(0)" to "(3)".

For example, when the sum of the products exceeds a predetermined value, the detector 24 determines that it is "OK", and when the sum of the products is lower than the predetermined value, the detector 24 determines that it is "NG". For example, when there are three or more types of the representative edge directions whose determination results are "OK", the detector 24 detects the attention area SaT as an adhered substance area Da.

On the other hand, when there are less than three types of the representative edge directions whose determination results are "OK", the detector 24 does not detect the attention area SaT as the adhered substance area Da.

That is, when the attention area SaT includes an aggregate in which chunks of plural types of the representative edge directions have a predetermined size, the detector 24 detects the attention area SaT as the adhered substance area. Even in such a case, it is possible to detect the adhered substance area rapidly.

For example, even when the products associated with the intersection CP are less than a threshold value separately set, the detector 24 may add the products to the sum of the products. That is, when the products are too large, the products need not be used for the above determination. As a result, since the above determination can be performed by using only the intersections CP similar to a feature of a snow-covered area, it is possible to improve detection accuracy of the snow-covered area.

The above-described embodiment and modification shows an example in which the representative edge direction (in each pixel PX having an angle range of 0° to 360°) is divided into four directions by each angle range of 90°. However, the angle range is not limited to 90°. For example, the representative edge direction may be divided into six directions by each angle range of 60°.

A first representative edge direction uses the first angle range as a unit and a second representative edge direction uses the second range as a unit. Widths of the respective angle ranges for the first representative edge direction and the second representative edge direction may be different from each other. For example, the first representative edge direction may be divided into four directions by each angle range of 90°, and the second representative edge direction may be divided into six directions by each angle range of 60°.

For the first representative edge direction and the second representative edge direction, respective boundaries of two adjacent angle ranges are deviated by an angle of 45° from each other. However, the deviated angle may exceed 45°, or may be less than 45°. It is possible to arbitrarily set the boundaries of two adjacent angle ranges for the first representative edge direction and the second representative edge direction.

In the above-described embodiment, although the photographic image I photographed by the camera to be mounted on the vehicle is used, the photographic image I photographed by a security camera or a camera on a street light may be used. That is, the photographic image I photographed by a camera with a lens to which an adhered substance can be adhered may be used.

It is possible for a person skilled in the art to easily come up with more effects and modifications. Thus, a broader modification of this invention is not limited to specific description and typical embodiments described and expressed above. Therefore, various modifications are possible without departing from the general spirit and scope of the invention defined by claims attached and equivalents thereof.

While the invention has been shown and described in detail, the foregoing description is in all aspects illustrative and not restrictive. It is therefore understood that numerous other modifications and variations can be devised without departing from the scope of the invention.

What is claimed is:

1. An adhered substance detection apparatus comprising a computer having a hardware processor configured to:

determine a representative edge direction using a predetermined angle range as a unit for each pixel area of a plurality of pixel areas of a photographic image photographed by a photographing device, the representative edge direction being determined for each of the pixel areas based on an edge angle of each pixel included in the pixel area;

extract an array pattern in which a plurality of the pixel areas having a same representative edge direction are continuously arranged along a predetermined scanning direction based on the representative edge directions of the pixel areas determined by the hardware processor; and detect whether an adhered substance area exists on a lens of the photographing device based on the array pattern extracted by the hardware processor, wherein the hardware processor extracts, as the array pattern, a first array pattern along a first scanning direction and a second array pattern along a second scanning direction perpendicular to the first scanning direction, and the hardware processor detects whether the adhered substance area exists based on an intersection between the first array pattern in the first scanning direction and the second array pattern in the second scanning direction.

2. The adhered substance detection apparatus according to claim 1, wherein the first and second array patterns are extracted when two pixel areas positioned on opposite sides of each of the first and second array patterns along the first and second scanning directions respectively have a value for the representative edge directions that is adjacent to a value of the representative edge direction of the first and second array patterns.

3. The adhered substance detection apparatus according to claim 1, wherein the hardware processor detects whether the adhered substance area exists for each attention area formed of a plurality of the pixel areas, and determines whether or not the attention area is the adhered substance area based on the first and second array patterns included in an extension area obtained by extending the attention area.

4. The adhered substance detection apparatus according to claim 1, wherein the hardware processor detects whether the adhered substance area exists based on types of the representative edge directions of the first and second array patterns that form the intersection.

5. The adhered substance detection apparatus according to claim 1, wherein the hardware processor detects whether the adhered substance area exists based on a total sum of products of the first and second array patterns that form the intersection.

6. The adhered substance detection apparatus according to claim 1, wherein the hardware processor determines a first representative edge direction using a first angle range as a unit and a second representative edge direction using a second angle range as a unit for each of the pixel areas, and the hardware processor extracts the first and second array patterns for each of the first representative edge direction and the second representative edge direction.

7. The adhered substance detection apparatus according to claim 1, wherein the hardware processor determines whether or not each of the representative edge directions satisfies a detection condition, and when a predetermined number or more of the representative edge directions satisfy the detection condition, the adhered substance area is detected to exist.

8. An adhered substance detection method comprising the steps of:

(a) determining, by a hardware processor of a computer, a representative edge direction using a predetermined angle range as a unit for each pixel area of a plurality of pixel areas of a photographic image photographed by a photographing device, the representative edge direction being determined for each of the pixel areas based on an edge angle of each pixel included in the pixel area;

(b) extracting, by the hardware processor, an array pattern in which a plurality of the pixel areas having a same representative edge direction are continuously arranged along a predetermined scanning direction based on the representative edge directions of the pixel areas determined in step (a); and (c) detecting, by the hardware processor, whether an adhered substance area exists on a lens of the photographing device for each of the pixel areas based on the array pattern extracted in step (b), wherein the hardware processor, in the step (b), extracts, as the array pattern, a first array pattern along a first scanning direction and a second array pattern along a second scanning direction perpendicular to the first scanning direction, and the hardware processor, in the step (c), detects whether the adhered substance area exists based on an intersection between the first array pattern in the first scanning direction and the second array pattern in the second scanning direction.

* * * * *